US008750231B1

(12) United States Patent
Oroskar et al.

(10) Patent No.: US 8,750,231 B1
(45) Date of Patent: Jun. 10, 2014

(54) ASSIGNMENT OF WIRELESS COVERAGE AREAS BASED ON MEDIA CODEC

(75) Inventors: Siddharth S. Oroskar, Overland Park, KS (US); Srini Penugonda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 68 days.

(21) Appl. No.: 13/483,933

(22) Filed: May 30, 2012

(51) Int. Cl.
*H04W 4/00* (2009.01)
*H04W 74/00* (2009.01)
*H04L 1/00* (2006.01)

(52) U.S. Cl.
CPC ........... *H04W 74/002* (2013.01); *H04L 1/0047* (2013.01)
USPC ........................................................ 370/329

(58) Field of Classification Search
CPC ............................ H04W 74/002; H04L 1/0047
USPC ........................................................ 370/329
See application file for complete search history.

(56) References Cited

U.S. PATENT DOCUMENTS

| | | | |
|---|---|---|---|
| 6,798,786 B1 | 9/2004 | Lo et al. | |
| 7,693,526 B2 | 4/2010 | Qian et al. | |
| 7,768,998 B1 * | 8/2010 | Everson et al. | 370/352 |
| 7,873,074 B1 | 1/2011 | Boland | |
| 2003/0063569 A1 | 4/2003 | Kalliokulju et al. | |
| 2004/0008627 A1 | 1/2004 | Garg et al. | |
| 2005/0261899 A1 | 11/2005 | Brueck et al. | |
| 2005/0288018 A1 | 12/2005 | Huang et al. | |
| 2006/0174015 A1 | 8/2006 | Arauz-Rosado | |
| 2007/0043558 A1 | 2/2007 | Schwarz et al. | |
| 2007/0047707 A1 * | 3/2007 | Mayer et al. | 379/114.28 |
| 2009/0209300 A1 | 8/2009 | Furbeck | |
| 2009/0227277 A1 | 9/2009 | Gupta et al. | |
| 2009/0303983 A1 * | 12/2009 | Kennedy | 370/352 |
| 2009/0322582 A1 | 12/2009 | Baugh et al. | |

OTHER PUBLICATIONS

Office Action for U.S. Appl. No. 13/598,042 mailed Oct. 25, 2012 (35 pages).
"Enhanced Variable Rate Codec, Speech Service Options 3, 68, 70, and 73 for Wideband Spread Spectrum Digital Systems," 3GPP2 C.S0014-D, Version 1, pp. 1-1 through 9-24 (May 2009).
CouthIT, "EVRC-A," 1 page, May 18, 2012 (www.couthit.com/codec-evrc.asp).
CouthIT, "EVRC-B," 1 page, May 18, 2012 (www.couthit.com/codec-evrc-b.asp).
CouthIT, "EVRC-NW," 2 pages, May 18, 2012 (www.couthit.com/codec-evrc-nw.asp).

(Continued)

*Primary Examiner* — Sai-Ming Chan

(57) ABSTRACT

A radio access network (RAN) may receive a call setup request from a wireless communication device (WCD). The call setup request may indicate that the WCD supports a first media codec. The RAN may obtain a set of candidate wireless coverage areas for serving the WCD. A first subset of the candidate wireless coverage areas may support the first media codec, and a second subset of the candidate wireless coverage areas might not support the first media codec. The RAN may assign traffic channels to the WCD, such that the assigned traffic channels include traffic channels from at least two of the first subset of the candidate wireless coverage areas, but do not include traffic channels from any of the second subset of the candidate wireless coverage areas. The RAN may communicate with the WCD substantially simultaneously via the assigned traffic channels using the first media codec.

20 Claims, 7 Drawing Sheets

(56) References Cited

OTHER PUBLICATIONS

CouthIT, "EVRC-C, EVRC-WB," 2 pages, May 18, 2012 (www.couthit.com/codec-evrc-wb.asp).

Desineni et al., "RTP Payload Format for the Enhanced Variable Rate Wideband Codec (EVRC-WB) and the Media Subtype Updates for EVRC-B Codec," Network Working Group, pp. 1-25 (Feb. 2008).
First Action Interview Pilot Program Pre-Interview Communication mailed Sep. 26, 2013 (29 pages).

* cited by examiner

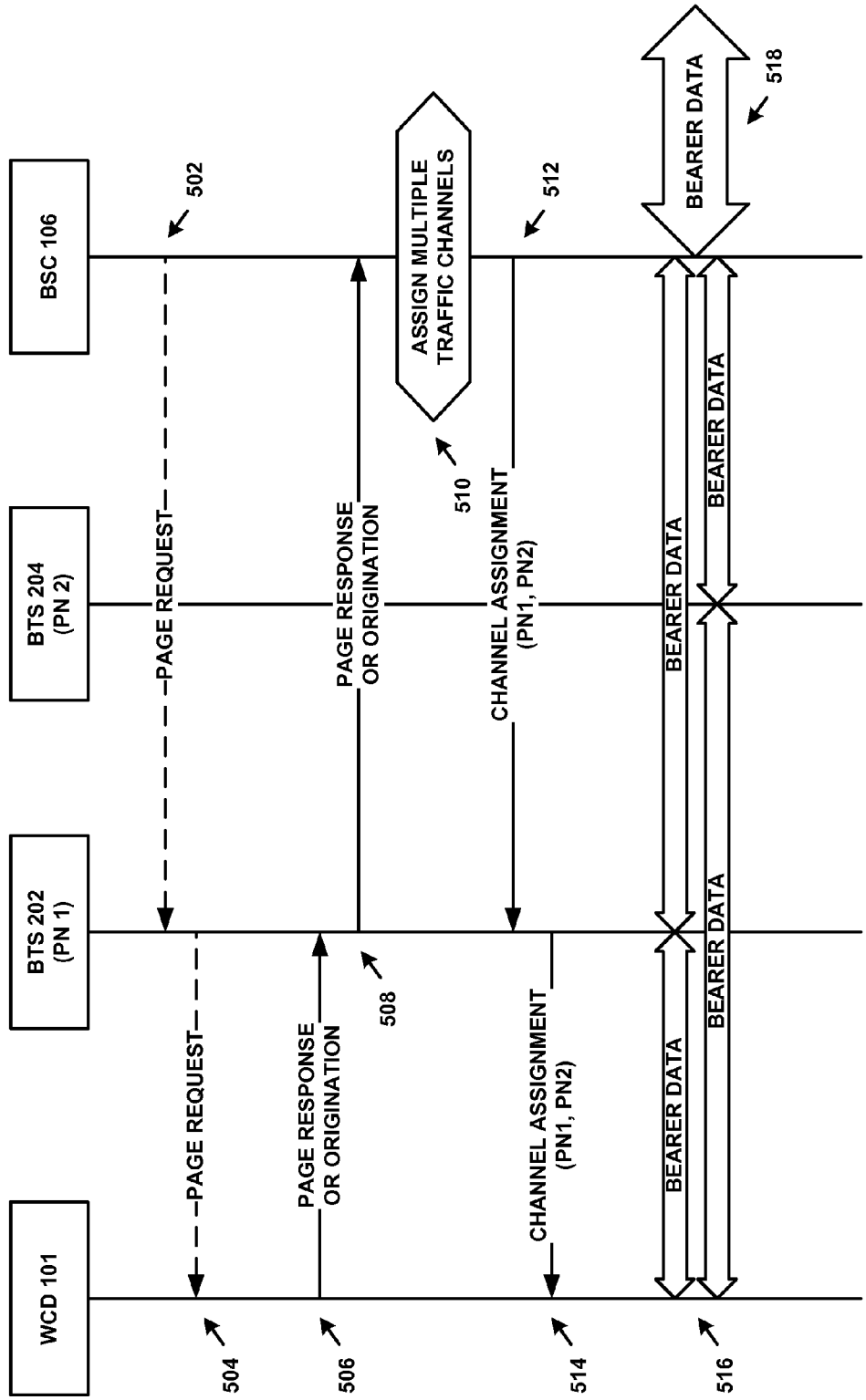

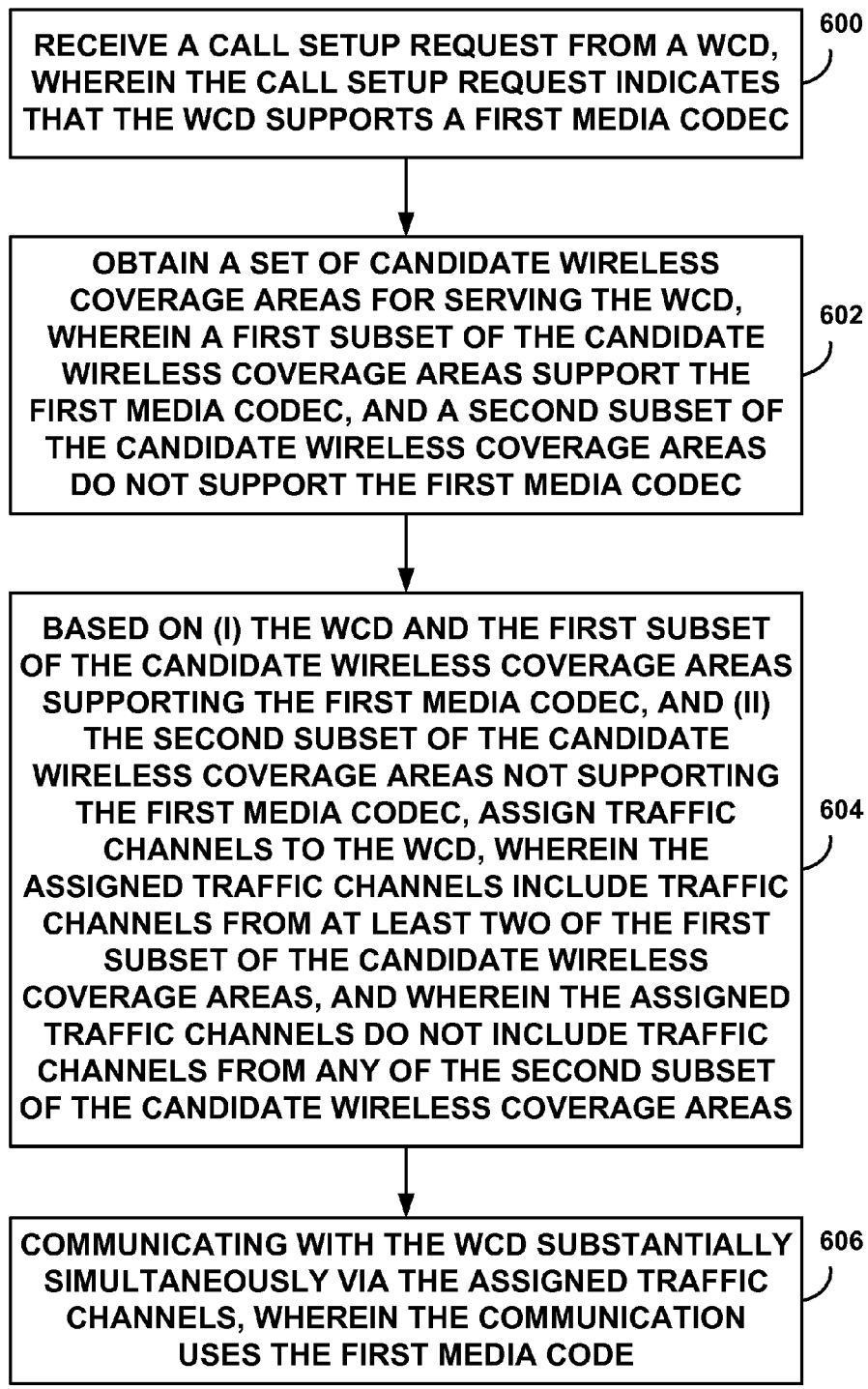

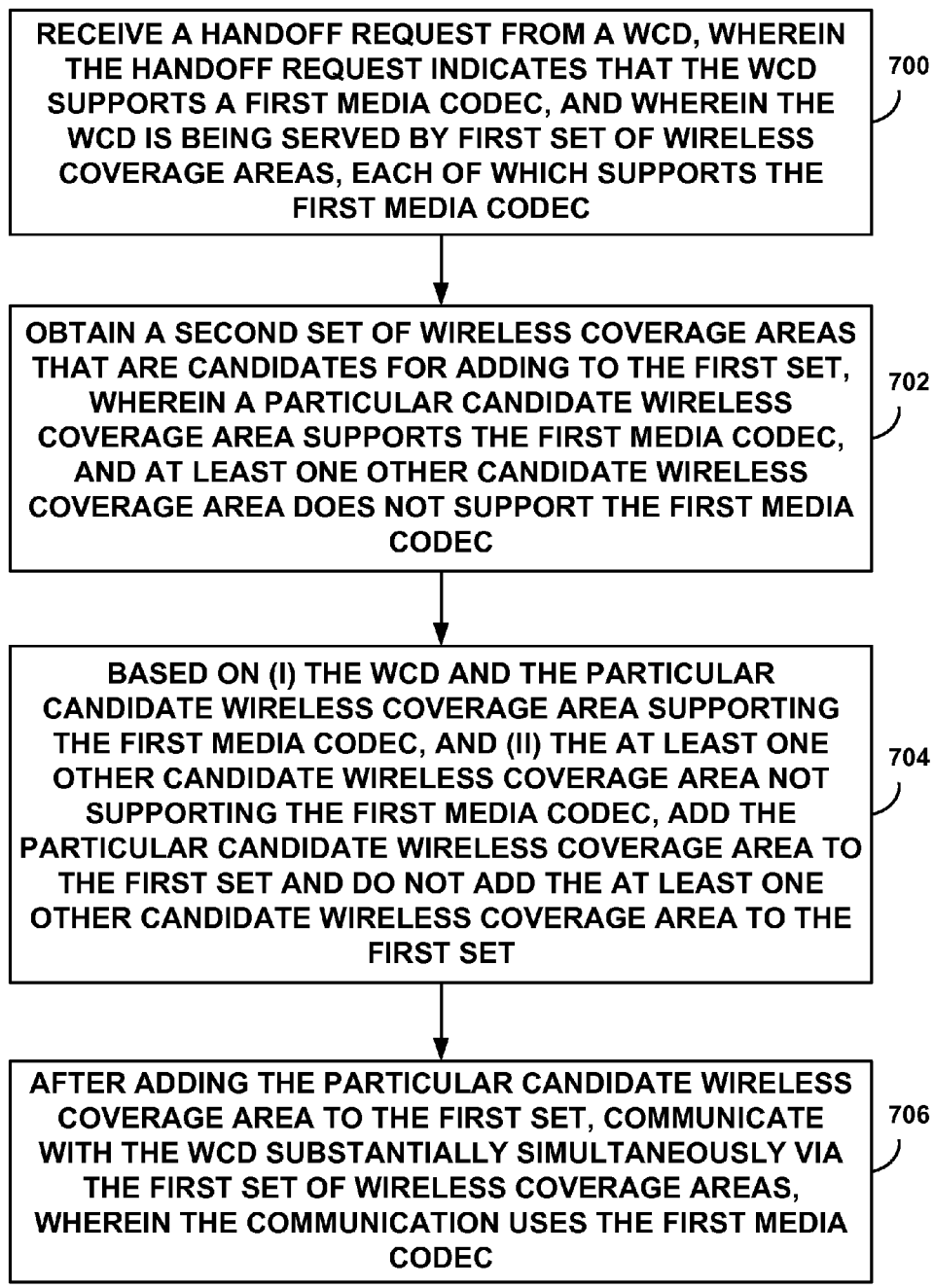

US 8,750,231 B1

ASSIGNMENT OF WIRELESS COVERAGE AREAS BASED ON MEDIA CODEC

BACKGROUND

Wireless service providers typically design their wireless networks to comprise a number of partially-overlapping wireless coverage areas. Each wireless coverage area may support one or more types of media codecs (e.g., voice, music, still image, and/or video codecs). As new, higher-quality and/or more efficient media codecs are deployed, wireless service providers may upgrade their base transceiver stations (BTSs) and/or its base station controllers (BSCs) to support these new media codecs.

OVERVIEW

During a call, a wireless communication device (WCD) may communicate substantially simultaneously via a number of wireless coverage areas. For instance, the WCD may receive the same information in two or more discrete messages from two or more different wireless coverage areas at approximately the same time. This substantially simultaneous communication may improve the reliability of communication involving the WCD.

However, in some cases, BTSs and/or BSCs that define these wireless coverage areas may be incrementally upgraded, resulting in some wireless coverage areas supporting the new media codecs, and other wireless coverage areas not supporting these media codecs. Thus, a WCD seeking to use a new media codec may not be able to do so via all available wireless coverage areas. In scenarios in which some available wireless coverage areas support the new codec and others do not, the WCD may resort to using an old media codec, instead of the new media codec. In this way, the WCD can engage in substantially simultaneous communication via any combination of the available wireless coverage areas.

Such an arrangement may limit the use of new media codecs, which, in turn, may reduce the efficiency of wireless network operation. Therefore, it may benefit both wireless network operators and subscribers for a radio access network (RAN) to attempt to assign wireless coverage areas that support one or more new media codecs to WCDs that support the same codecs.

Accordingly, in a first example embodiment, a RAN may receive a call setup request from a WCD. The call setup request may indicate that the WCD supports a first media codec. The RAN may obtain a set of candidate wireless coverage areas for serving the WCD. A first subset of the candidate wireless coverage areas may support the first media codec, and a second subset of the candidate wireless coverage areas might not support the first media codec. Possibly based on (i) the WCD and the first subset of the candidate wireless coverage areas supporting the first media codec, and (ii) the second subset of the candidate wireless coverage areas not supporting the first media codec, the RAN may assign traffic channels to the WCD. The assigned traffic channels may include traffic channels from at least two of the first subset of the candidate wireless coverage areas, and no traffic channels from any of the second subset of the candidate wireless coverage areas. The RAN may communicate with the WCD substantially simultaneously via the assigned traffic channels. The communication between the RAN and the WCD may use the first media codec.

In a second example embodiment, a RAN may receive a handoff request from a WCD. The handoff request may indicate that the WCD supports a first media codec. The WCD may be served by first set of wireless coverage areas, each of which supports the first media codec. A second set of wireless coverage areas that are candidates for adding to the first set may be obtained. A particular candidate wireless coverage area may support the first media codec, and other candidate wireless coverage area(s) might not support the first media codec. Possibly based on (i) the WCD and the particular candidate wireless coverage area supporting the first media codec, and (ii) the other candidate wireless coverage area(s) not supporting the first media codec, the RAN may add the particular candidate wireless coverage area to the first set, but not add the other candidate wireless coverage area(s) to the first set. After adding the particular candidate wireless coverage area to the first set, the RAN may communicate with the WCD substantially simultaneously via the first set of wireless coverage areas. The communication between the RAN and the WCD may use the first media codec.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

BRIEF DESCRIPTION OF THE DRAWINGS

FIG. 5 is a second message flow diagram, in accordance with an example embodiment;

FIG. 6 is a first flow chart, in accordance with an example embodiment; and

FIG. 7 is a second flow chart, in accordance with an example embodiment.

DESCRIPTION

I. Network Architecture

Figure 1:
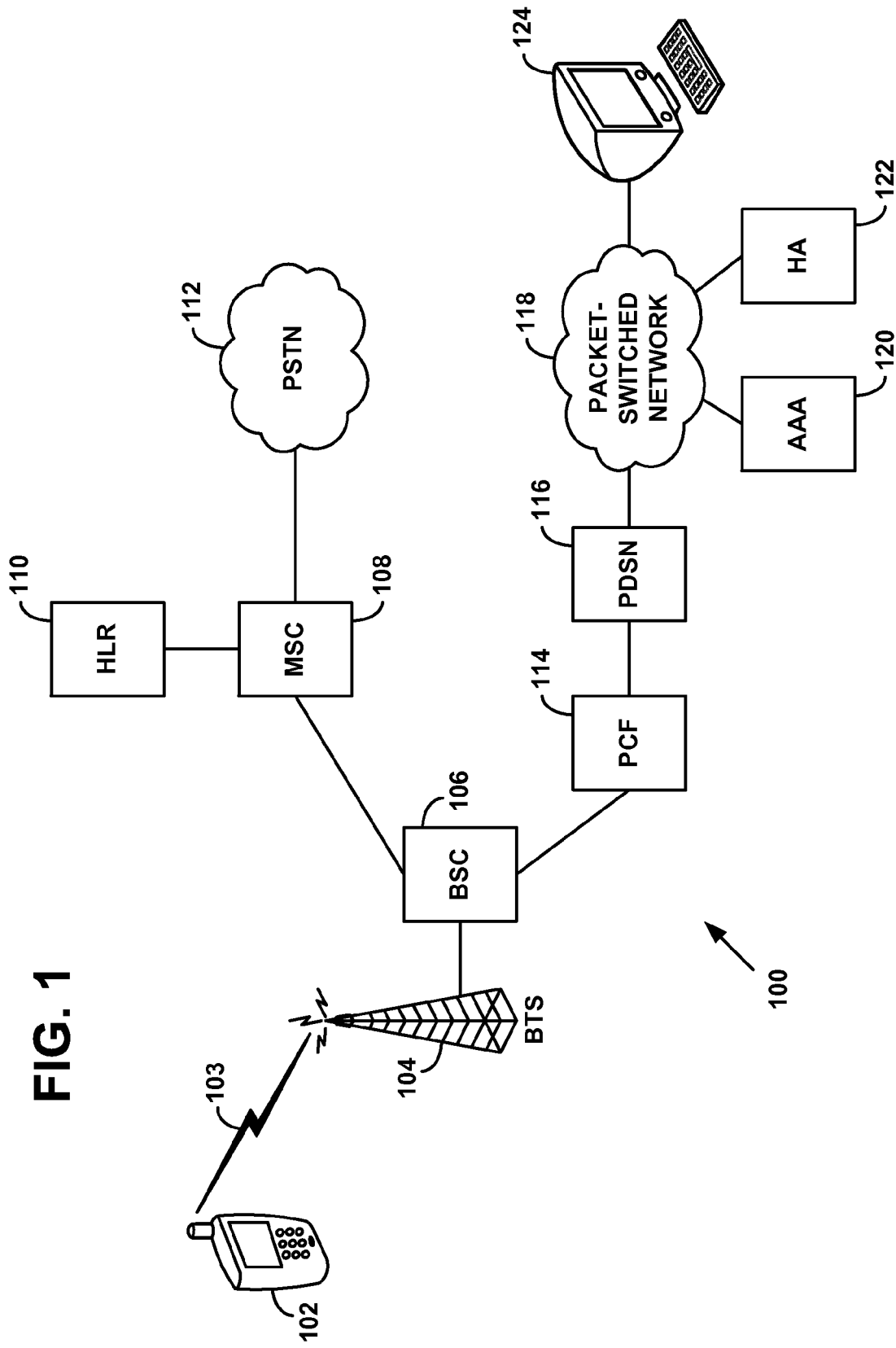
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD.

BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
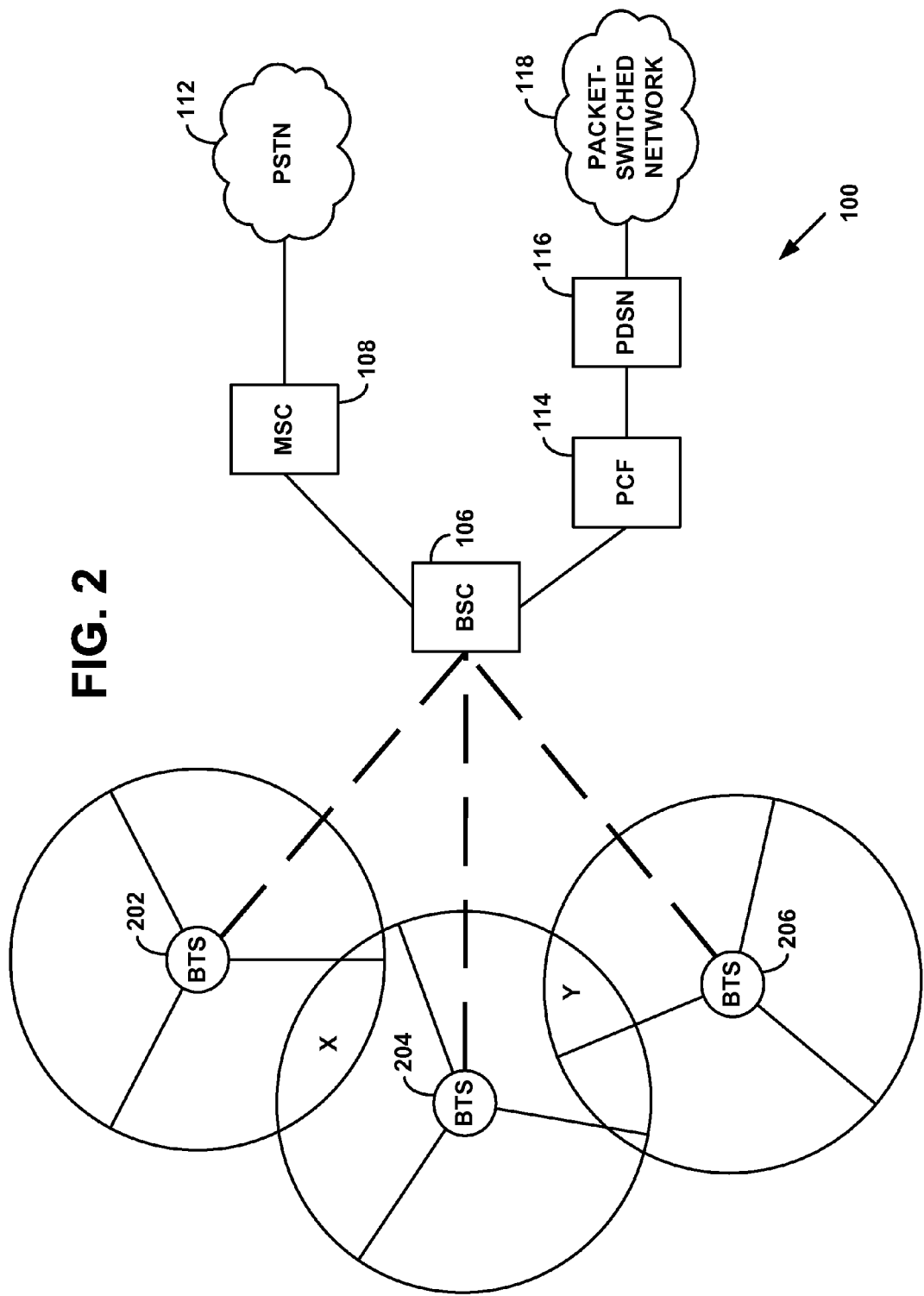
FIG. 2 depicts a RAN radiating to define several wireless coverage areas, in accordance with an example embodiment.

In practice, a BSC may serve multiple BTSs, each of which may then radiate to define a wireless coverage area. Each wireless coverage area, in turn, may comprise a plurality of wireless coverage areas. This arrangement is illustrated in FIG. 2, which shows BSC 106 in network 100 coupled with BTSs 202, 204, and 206. Each BTS is shown at the core of a respective circle representing a wireless coverage area, and each wireless coverage area is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage areas need not be circular, and may take on other shapes and arrangements instead.

A WCD may receive the same bearer data simultaneously from more than one wireless coverage area. To illustrate that point, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
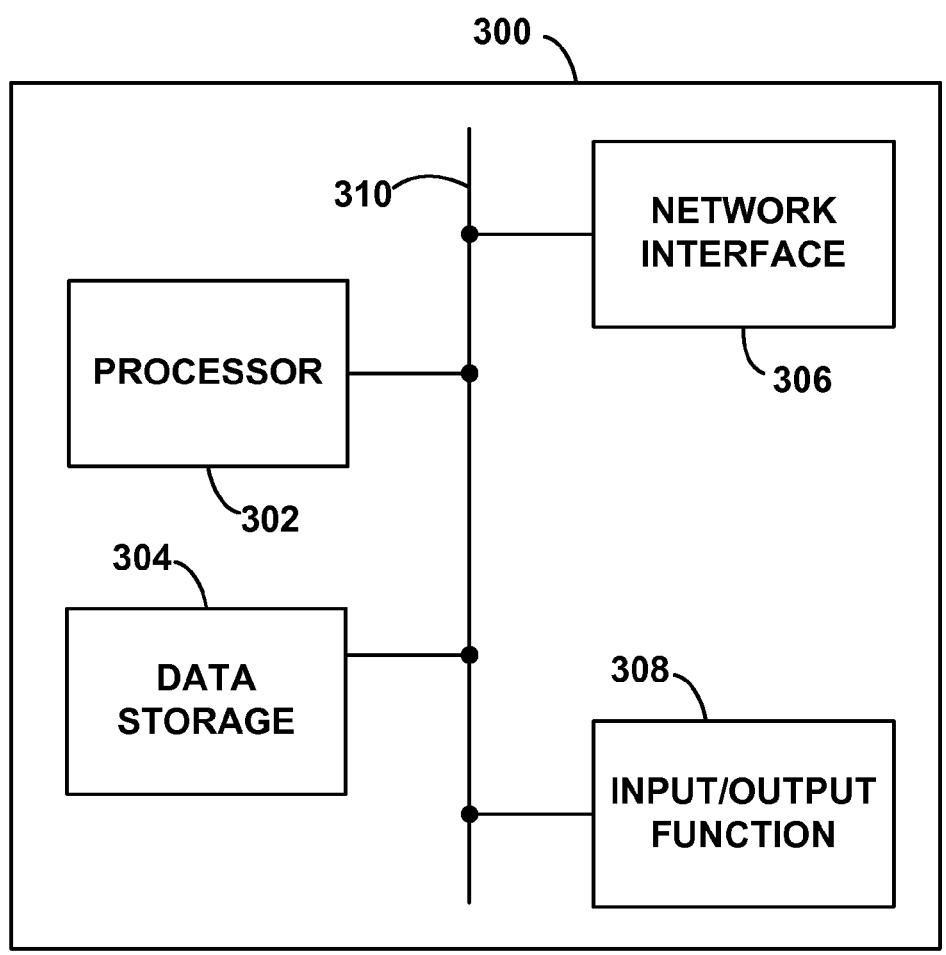
FIG. 3 is a block diagram of a RAN component, in accordance with an example embodiment.

FIG. 3 is a simplified block diagram exemplifying a RAN device 300, illustrating some of the functional components that could be included in a RAN device arranged to operate in accordance with the embodiments herein. Example RAN device 300 could be any type of device found in or associated with a RAN, such as a BTS, a BSC, or an MSC. For purposes of simplicity, this specification may equate RAN device 300 to a BSC from time to time. Nonetheless, it should be understood that the description of RAN device 300 could apply to any component used for the purposes described herein.

In this example, RAN device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs) or digital signal processors (DSPs), etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions, perhaps stored on a non-transitory computer-readable medium, executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN device 300 may support remote access from another device, via network interface 306 or via another interface (not shown), such an RS-232 or USB port.

II. CDMA Communications

For purposes of illustration, an example that uses Code Division Multiple Access (CDMA) communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area. Each of these scenarios are described below.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

b. Soft Handoff

During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as soft "handoff" when the handoff is between wireless coverage areas of different BTSs, and softer "handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

- T_ADD: Threshold pilot strength for addition to the active set (e.g., −14 decibels (dB))
- T_COMP: Difference in signal strength from an active set pilot (e.g., 2 dB)
- T_DROP: Threshold pilot strength for removal from the active set (e.g., −16 dB)
- T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

c. Channel Assignment

Figure 4:
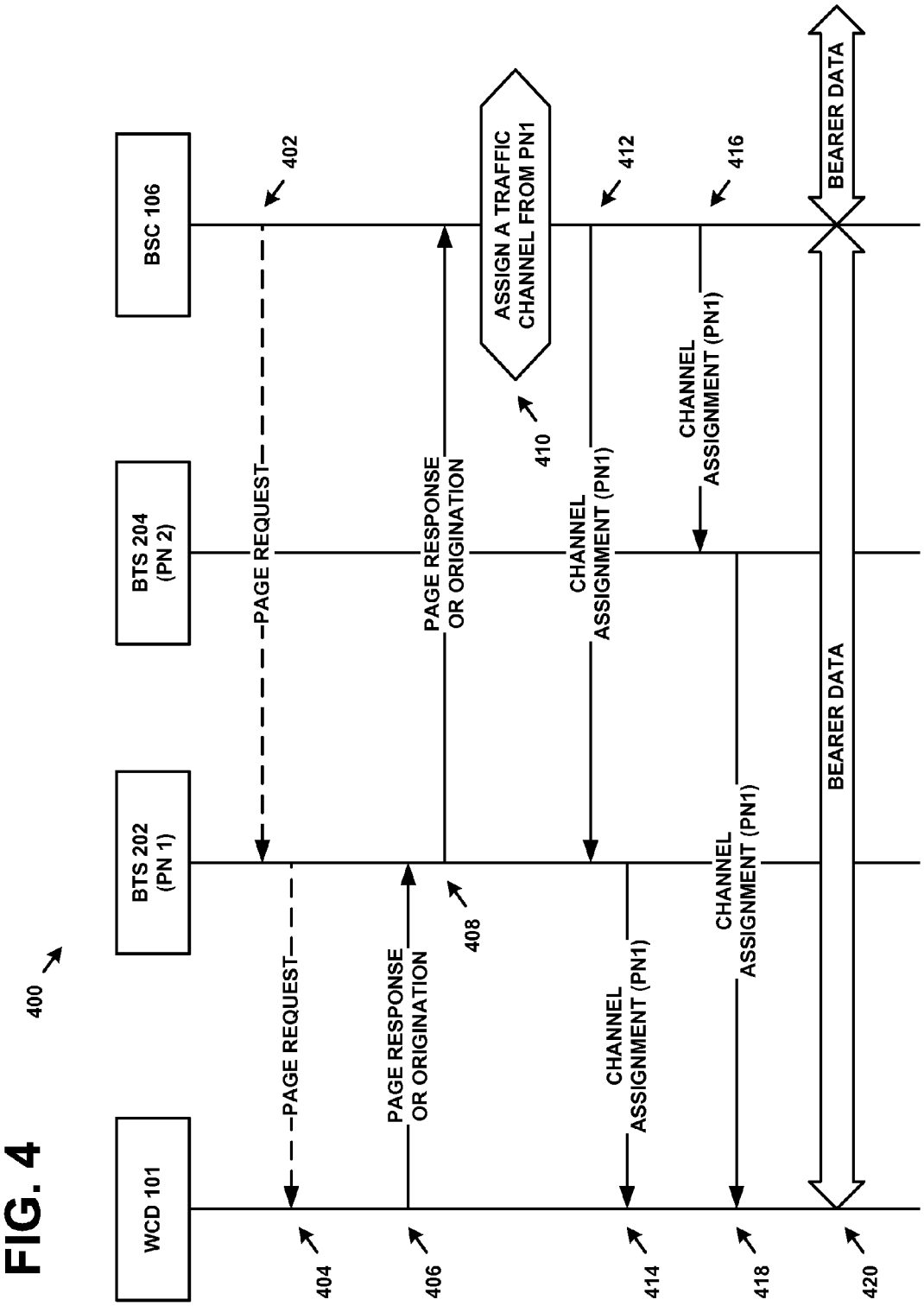
FIG. 4 is a first message flow diagram, in accordance with an example embodiment.

For purposes of illustration, FIG. 4 shows an example message flow 400 of a RAN transmitting channel assignment messages via multiple wireless coverage areas during call establishment. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 may be controlled by BSC 106. WCD 101 may be able to receive pilot channel signals of sufficient strength from both PN 1 and PN 2 such that WCD 101 could communicate effectively via either of these wireless coverage areas. Without loss of generality, it is assumed that PN 1 is the primary wireless coverage area of WCD 101.

WCD 101 may report, to BSC 106, measurements of the signal strengths at which WCD 101 receives the pilot channels of PN 1 and PN2. This reporting may occur through the transmission of radio environment reports or pilot strength measurement messages (PSMMs), or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. These considerations may be based on, for example, just the most recently-received measurement, or several recently received measurements. BSC 106 may use these received signal strengths, and/or other information, when determining from which wireless coverage area to assign a traffic channel. Thus, if BSC 106 determines that WCD 101 receives the pilot signal from PN 1 at a lower strength than that of PN 2, BSC 106 may instead assign a traffic channel from PN 2 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code to receive from PN 1. Similarly, at steps 416 and 418, BSC 106 may transmit a second channel assignment message via BTS 204 to WCD 101. The second channel assignment message may also include a traffic channel assignment for PN 1 (thus, these two channel assignment messages may serve to assign the same channel). By transmitting multiple channel assignment messages to WCD 101, the likelihood that WCD 101 receives at least one of these messages is increased. Regardless, at step 420, WCD 101 may begin receiving bearer traffic via BTS 202 (using PN 1).

While message flow 400 shows only two channel assignment messages being transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

d. Substantially Simultaneous Transmission of Bearer Data

As described in Section IIb, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Channel Assignment into Soft Handoff (CASHO) has been proposed as a way of assignment multiple traffic channels from different wireless coverage areas to a WCD during call establishment. Thus, using CASHO procedures may increase the reliability and quality of the initial portions of the calls. For purposes of illustration, FIG. 5 shows an example message flow 500 of a RAN and WCD engaging in CASHO procedures. Like FIG. 4, FIG. 5 involves WCD 101, BTS 202, BTS 204, and BSC 106.

Steps 502 and 504 illustrate BSC 106, via BTS 202, transmitting an optional page request message to WCD 101. Steps 506 and 508 illustrate WCD 101 transmitting a page response message or origination message via BTS 202 to BSC 106. At step 510, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in radio environment reports or PSMMs, the page response or origination message of steps 506 and 508, or in some other type of message. In any case, BSC 106 may use these received signal strengths, and/or other information, when determining whether and/or how to perform CASHO procedures.

At steps 512 and 514, BSC 106 may transmit a channel assignment message via BTS 202 to WCD 101. The channel assignment message may include traffic channel assignments for both PN 1 and PN 2. In other words, the channel assignment message may instruct WCD 101 to use a particular Walsh code with PN 1 and another Walsh code with PN 2. Accordingly, at steps 516 and 518, WCD 101 may begin transmitting and receiving bearer data via both BTS 202 (using PN 1) and BTS 204 (using PN 2). Thus, via both BTS 202 and BTS 204, WCD 101 may receive forward direction bearer data streams from BSC 106, and may combine these streams into a single stream of bearer data. For example, WCD 101 may add the received signals from BTS 202 and BTS 204. Conversely, via both BTS 202 and BTS 204, BSC 106 may receive reverse direction bearer data streams from WCD 101, and may also combine these streams into a single stream of bearer data.

It should be understood that rather than traversing BTS 202, any of the page request messages, page response or origination messages, and/or channel assignment messages may instead traverse BTS 204, or both BTS 202 and BTS 204. Alternatively, BSC 106 may assign WCD 101 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation.

III. Example Media Codecs

As noted above, a media codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may use the same (or a similar) voice codec to decode the utterance from the particular format so that the destination WCD can play out the resulting signal.

Media codecs may be either lossless or lossy. Lossless media codecs may use an encoding format that allows the encoded media to be decoded back to its original format. Thus, lossless media codecs may support high quality transmission and storage of media.

On the other hand, some media codecs are lossy. Lossy codecs are typically used on media for which some degree of degradation is acceptable. For instance, compact disc audio can be compressed to about 10-20% of its size (i.e., achieving about 80-90% compression) by using an MP3 codec to discard the audio components that are beyond the auditory resolution ability of most individuals. Thus, to most listeners, music encoded in the MP3 format sounds about the same as it would if played directly from the compact disc. Similarly, voice codecs may take advantage of psychoacoustics to remove redundant or less audible components of voice signals, resulting in about 80-90% compression of the voice signal.

In general, different lossy codecs may support different extents of lossy compression (e.g., some codecs will support compression with more loss than other codecs). Some lossy codecs may support multiple extents of lossy compression (e.g., a particular codec may select between two or more rates of lossy compression).

In general, there may be a roughly linear relationship between media codec bit rate and the media quality that the media codec produces at that bit rate. For example, a voice codec operating at 9.6 kilobits per second is likely to produce better quality voice than a voice codec operating at 4.8 kilobits per second. However, as media codec technologies advance, new media codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of media codecs, several different voice codecs are compared and contrasted below. Particularly, CDMA wireless networks may use one or more codecs from the Enhanced Variable Rate Codec (EVRC) family.

For instance, the EVRC-A codec operates on input speech signals sampled with 16-bit resolution 8,000 times per second (e.g., 8,000 Hz). The resulting 128 kilobit per second stream is divided into 20 millisecond frames, each of which is compressed to either 171 bits (8.55 kilobit per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec supports at least some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB. EVRC-NW may also be referred to as CMDA service option 73.

The media codecs described herein are only examples. Other voice or non-voice codecs may be used instead.

Given the benefits of some media codecs (e.g., EVRC-WB and EVRC-NW) over others (e.g., EVRC-A and EVRC-B), the RAN may preferentially assign wireless coverage areas to a WCD so that the WCD can engage in substantially simultaneous communication with a more advanced media codec, if possible. These advanced codecs may be capable of supporting higher-quality voice calls, perhaps at a lower bit rate. Also, advanced codecs may be capable of supporting more bit rates (e.g., more operating modes) as well as advanced features, such as special encoding for non-speech signals.

For example, suppose that the WCD supports EVRC-WB and EVRC-B, and that the RAN has eight candidate wireless coverage areas that can be assigned to the WCD to transport the WCD's communication. Suppose further that two of these wireless coverage areas support both EVRC-WB and EVRC-B, while the remaining six support only EVRC-B. If the RAN assigns at least one of the six wireless coverage areas that support only EVRC-B to the WCD, the WCD may be limited to using EVRC-B for voice calls. However, if the RAN assigns wireless coverage areas to the WCD only from the two that support both EVRC-WB and EVRC-B, the WCD may be able to use EVRC-WB for voice calls.

Therefore, when deciding which wireless coverage areas to assign to a WCD, the RAN may determine one or more codecs supported by the WCD. For example, at step 510 of FIG. 5, BSC 106 may determine that WCD 101 supports EVRC-WB and EVRC-B. BSC 106 may make this determination based on indications of one or more service options contained in the page response or origination message of step 508. However, BSC 106 may determine supported media codecs in other ways as well. For instance, BSC 106 may store or have access to information that indicates one or more media codecs supported by WCD 101. Alternatively, or additionally, BSC 106 may query WCD 101, thus triggering the WCD 101 to transmit a list of one or more supported codecs to BSC 106. This query may occur periodically, from time to time, or in response to receiving the resource requests.

Possibly also part of step 510, BSC 106 may determine that wireless coverage areas of BTS 202 and BTS 204 support both EVRC-WB and EVRC-B, while wireless coverage areas of BTS 206 (not shown in FIG. 5) support only EVRC-B. Consequently, if BSC 106 assigns channels from one or more wireless coverage areas of BTS 206 to WCD 101, WCD 101 may be limited to communicating using EVRC-B. However, if BSC 106 assigns channels from one or more wireless coverage areas of BTS 202 and/or BTS 204, WCD 101 may be able to communicate using EVRC-WB. Thus, in some embodiments, BSC 106 may preferentially assign channels from just wireless coverage areas of BTS 202 and/or BTS 204 to WCD 101.

In general, a RAN may preferentially assign wireless coverage area channels to WCDs so that substantially simultaneous communication with certain media codecs can take place. For instance, a RAN may preferentially assign wireless coverage areas to WCDs to enable those WCDs to use EVRC-NW over EVRC-WB, EVRC-WB over EVRC-B, and/or EVRC-B over EVRC-A. In this way, the RAN is more likely to provide users with higher quality voice calls, perhaps at lower bit rates and with support for efficient processing of non-speech signals. The RAN may apply these preferential assignments to new calls, to calls that are being handed off, or both.

IV. Example Operations

FIGS. 6 and 7 are flow charts depicting example embodiments. One or more steps of either of both of these example embodiments may be carried out, for instance, by a RAN component exemplified by RAN device 300.

At step 600 of FIG. 6, a RAN may receive a call setup request from a WCD. The call setup request may indicate that the WCD supports a first media codec. Alternatively, the RAN may determine the media codec(s) supported by the WCD in some other fashion. At step 602, the RAN may obtain a set of candidate wireless coverage areas for serving the WCD. A first subset of the candidate wireless coverage areas may support the first media codec, and a second subset of the candidate wireless coverage areas might not support the first media codec.

At step 604, based on (i) the WCD and the first subset of the candidate wireless coverage areas supporting the first media codec, and (ii) the second subset of the candidate wireless coverage areas not supporting the first media codec, the RAN may assign traffic channels to the WCD. The assigned traffic channels may include traffic channels from at least two of the first subset of the candidate wireless coverage areas, and might not include traffic channels from any of the second subset of the candidate wireless coverage areas.

Assigning traffic channels to the WCD may involve the RAN transmitting channel assignment messages to the WCD via at least two of the candidate wireless coverage areas. When doing so, the RAN might not transmit channel assignment messages to the WCD via any of the second subset of the candidate wireless coverage areas.

In some embodiments, the second subset of the candidate wireless coverage areas may support a second media codec, and the first media codec may be capable of producing higher voice quality voice calls than the second media codec. For instance, the first media codec may use a first sampling rate of over 8,000 Hz, and the second media codec may use a second sampling rate of 8,000 Hz or less. The RAN may assign the assigned traffic channels to the WCD also based on the first media codec being capable of producing higher voice quality voice calls than the second media codec.

Further, the first media codec may be capable of producing higher voice quality voice calls at a lower bit-rate than the second media codec. The RAN may assign the assigned traffic channels to the WCD also based on the first media codec being capable of producing higher voice quality voice calls at a lower bit-rate than the second media codec.

Alternatively or additionally, the first media codec may be capable of supporting a larger number and/or range of bit rates than the second media codec. The RAN may assign the assigned traffic channels to the WCD also based on the first media codec being capable of supporting a larger number and/or range of bit rates than the second media codec.

At step 606, the RAN may communicate with the WCD substantially simultaneously via the assigned traffic channels. The communication between the RAN and the WCD may use the first media codec. The RAN communicating with the WCD substantially simultaneously via the assigned traffic channels may involve, during an initial portion of the communication between the RAN and the WCD (e.g., the first few milliseconds or the first few seconds of a call), the RAN exchanging bearer traffic with the WCD via each of the assigned traffic channels. For instance, the RAN may transmit and receive the same bearer traffic via each of the assigned traffic channels. Alternatively or additionally, the RAN communicating with the WCD substantially simultaneously via the assigned traffic channels may involve the substantially simultaneous communications traversing at least two of the first subset of the candidate wireless coverage areas at approximately the same time.

FIG. 7 depicts another example embodiment. At step 700, a RAN may receive a handoff request from a WCD. The handoff request may indicate that the WCD supports a first media codec. The WCD may be served by a first set of wireless coverage areas, each of which supports the first media codec.

At step 702, a second set of wireless coverage areas that are candidates for adding to the first set may be obtained. A particular candidate wireless coverage area may support the first media codec, and at least one other candidate wireless coverage area might not support the first media codec.

At step 704, based on (i) the WCD and the particular candidate wireless coverage area supporting the first media codec, and (ii) the at least one other candidate wireless coverage area not supporting the first media codec, the RAN may add the particular candidate wireless coverage area to the first set. Additionally, the RAN might not add the at least one other candidate wireless coverage area to the first set.

At step 706, after adding the particular candidate wireless coverage area to the first set, the RAN may communicate with the WCD substantially simultaneously via the first set of wireless coverage areas. The communication between the RAN and the WCD may use the first media codec.

It should be understood that FIGS. 6 and 7 depict non-limiting embodiments. Thus, more or fewer steps than shown in FIGS. 6 and 7 may be used without departing from the scope of the embodiments herein. Additionally, some of these steps may be repeated one or more times, or may be omitted altogether. Further, the message flows and flow charts of the figures may be combined with one another and/or with other aspects described this specification and its accompanying drawings, in whole or in part, also without departing from the scope of the embodiments herein. For instance, any of the features discussed in the context of FIG. 6 may also be applied to methods illustrated by the flow chart of FIG. 7.

In the drawings, a step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by one or more processors for implementing specific logical functions or actions in the method or technique. The program code and/or related data may be stored on any type of computer-readable medium, such as a storage device, including a disk drive, a hard drive, or other storage media.

V. Conclusion

Example embodiments have been described above. Those skilled in the art will understand, however, that changes and modifications may be made to these embodiments herein without departing from the true scope and spirit of the invention, which is defined by the claims.

What is claimed is:

1. A method comprising:
   a radio access network (RAN) receiving a call setup request from a wireless communication device (WCD), wherein the call setup request indicates that the WCD supports a first media codec;
   the RAN obtaining a set of candidate wireless coverage areas for serving the WCD, wherein a first subset of the candidate wireless coverage areas support the first media codec, and a second subset of the candidate wireless coverage areas do not support the first media codec;
   based on (i) the WCD and the first subset of the candidate wireless coverage areas supporting the first media codec, and (ii) the second subset of the candidate wireless coverage areas not supporting the first media codec, the RAN assigning traffic channels to the WCD, wherein the assigned traffic channels include traffic channels from at least two of the first subset of the candidate wireless coverage areas, and wherein the assigned traffic channels do not include traffic channels from any of the second subset of the candidate wireless coverage areas; and
   the RAN communicating with the WCD substantially simultaneously via the assigned traffic channels, wherein the communication between the RAN and the WCD uses the first media codec.

2. The method of claim 1, wherein the second subset of the candidate wireless coverage areas support a second media codec, wherein the first media codec is configured to produce higher voice quality voice calls than the second media codec, and wherein the RAN assigns the assigned traffic channels to the WCD also based on the first media codec being configured to produce higher voice quality voice calls than the second media codec.

3. The method of claim 2, wherein the first media codec is configured to produce higher voice quality voice calls at a lower bit-rate than the second media codec, and wherein the RAN assigns the assigned traffic channels to the WCD also based on the first media codec being configured to produce higher voice quality voice calls at a lower bit-rate than the second media codec.

4. The method of claim 2, wherein the first media codec uses a first sampling rate of over 8000 Hz, and wherein the second media codec uses a second sampling rate of 8000 Hz or less.

5. The method of claim 1, wherein the first media codec is configured to support a larger range of bit rates than the second media codec, and wherein the RAN assigns the assigned traffic channels to the WCD also based on the first media codec being configured to support a larger range of bit rates than the second media codec.

6. The method of claim 1, wherein the RAN assigning traffic channels to the WCD comprises the RAN transmitting channel assignment messages to the WCD via at least two of the candidate wireless coverage areas.

7. The method of claim 6, wherein the RAN assigning traffic channels to the WCD comprises the RAN transmitting channel assignment messages to the WCD via at least two of the first subset of the candidate wireless coverage areas, and not transmitting channel assignment messages to the WCD via any of the second subset of the candidate wireless coverage areas.

8. The method of claim 1, wherein the RAN communicating with the WCD substantially simultaneously via the assigned traffic channels comprises during an initial portion of the communication between the RAN and the WCD, the RAN exchanging bearer traffic with the WCD via each of the assigned traffic channels.

9. The method of claim 8, wherein the RAN transmits and receives the same bearer traffic via each of the assigned traffic channels.

10. The method of claim 1, wherein the RAN communicating with the WCD substantially simultaneously via the assigned traffic channels comprises the substantially simultaneous communications traversing each at least two of the first subset of the candidate wireless coverage areas at approximately the same time.

11. An article of manufacture including a non-transitory computer-readable medium, having stored thereon program instructions that, upon execution by a radio access network (RAN) device, cause the RAN device to perform operations comprising:
   receiving a call setup request from a wireless communication device (WCD), wherein the call setup request indicates that the WCD supports a first media codec;
   obtaining a set of candidate wireless coverage areas for serving the WCD, wherein a first subset of the candidate wireless coverage areas support the first media codec, and a second subset of the candidate wireless coverage areas do not support the first media codec;
   based on (i) the WCD and the first subset of the candidate wireless coverage areas supporting the first media codec, and (ii) the second subset of the candidate wireless coverage areas not supporting the first media codec, assigning traffic channels to the WCD, wherein the assigned traffic channels include traffic channels from at least two of the first subset of the candidate wireless coverage areas, and wherein the assigned traffic channels do not include traffic channels from any of the second subset of the candidate wireless coverage areas; and
   communicating with the WCD substantially simultaneously via the assigned traffic channels, wherein the communication between the RAN and the WCD uses the first media codec.

12. The article of manufacture of claim 11, wherein the second subset of the candidate wireless coverage areas support a second media codec, wherein the first media codec is configured to produce higher voice quality voice calls than the second media codec, and wherein the RAN assigns the assigned traffic channels to the WCD also based on the first media codec being configured to produce higher voice quality voice calls than the second media codec.

13. The article of manufacture of claim 12, wherein the first media codec is configured to produce higher voice quality voice calls at a lower bit-rate than the second media codec, and wherein the RAN assigns the assigned traffic channels to the WCD also based on the first media codec being configured to produce higher voice quality voice calls at a lower bit-rate than the second media codec.

14. The article of manufacture of claim 12, wherein the first media codec uses a first sampling rate of over 8000 Hz, and wherein the second media codec uses a second sampling rate of 8000 Hz or less.

15. The article of manufacture of claim 11, wherein the first media codec is configured to support a larger range of bit rates than the second media codec, and wherein the RAN assigns the assigned traffic channels to the WCD also based on the first media codec being configured to support a larger range of bit rates than the second media codec.

16. The article of manufacture of claim 11, wherein assigning traffic channels to the WCD comprises the transmitting channel assignment messages to the WCD via at least two of the candidate wireless coverage areas.

17. The article of manufacture of claim 16, wherein assigning traffic channels to the WCD comprises transmitting channel assignment messages to the WCD via at least two of the first subset of the candidate wireless coverage areas, and not transmitting channel assignment messages to the WCD via any of the second subset of the candidate wireless coverage areas.

18. The article of manufacture of claim 11, wherein communicating with the WCD substantially simultaneously via the assigned traffic channels comprises during an initial portion of the communication between the RAN and the WCD, the RAN exchanging bearer traffic with the WCD via each of the assigned traffic channels.

19. The article of manufacture of claim 18, wherein the RAN transmits and receives the same bearer traffic via each of the assigned traffic channels.

20. The article of manufacture of claim 11, wherein the RAN communicating with the WCD substantially simultaneously via the assigned traffic channels comprises the substantially simultaneous communications traversing each at least two of the first subset of the candidate wireless coverage areas at approximately the same time.

* * * * *